United States Patent [19]

Schepers, deceased et al.

[11] 4,252,235
[45] Feb. 24, 1981

[54] APRON CONVEYOR

[75] Inventors: Rudolf Schepers, deceased, late of Friedrichsdorf, Fed. Rep. of Germany, by Brigitte Schepers, administrator; Herbert Klug, Bad Homburg, Fed. Rep. of Germany

[73] Assignee: TKV Transportanlagen-Konstruktions- und Vertriebd-GmbH, Bad Homburg, Fed. Rep. of Germany

[21] Appl. No.: 962,358

[22] Filed: Nov. 20, 1978

[30] Foreign Application Priority Data

Nov. 26, 1977 [DE] Fed. Rep. of Germany ....... 2752945

[51] Int. Cl.³ .............................................. B65G 17/10
[52] U.S. Cl. .................................................... 198/822
[58] Field of Search ............... 198/645, 712, 793, 802, 198/822

[56] References Cited

FOREIGN PATENT DOCUMENTS

| 972470 | 7/1959 | Fed. Rep. of Germany | 198/822 |
| 1200260 | 12/1959 | France | 198/822 |
| 943700 | 12/1963 | United Kingdom | 198/822 |

*Primary Examiner*—Robert B. Reeves
*Assistant Examiner*—Douglas D. Watts
*Attorney, Agent, or Firm*—Sprung, Felfe, Horn, Lynch & Kramer

[57] ABSTRACT

There is disclosed a conveyor comprising an endless sprocket-toothed traction chain disposed about and engaged by at least two sets of sprocketed teeth reversing means where the chain carries a carrier which, at its trailing end, is attached to a roller-carrying axle which is connected to the traction chain through a coupling flight which is detachably secured to the traction chain. The carrier is connected at its leading edge to a chain-connecting axle which, in turn, is connected to a supporting link. The supporting link is secured, in turn, by a pin to a chain link of the tractor chain. The pin is disposed above the center line of the traction chain at the center of the length thereof. The tooth spacing of the traction chain sprockets are such that a tooth space is associated with the pin of the supporting link as the pin enters the sprocket.

4 Claims, 2 Drawing Figures

APRON CONVEYOR

BACKGROUND OF THE INVENTION

1. Field of the Invention

This invention relates to an apron conveyor in which the carrier pitch is a multiple of the chain pitch and the conveyor comprises traction chains which, in turn, carry carriers, the chain being reversed at reversing stations by sprocketed wheels. The carrier is provided at its trailing end with a roller-carrying axle which cooperates with coupling flights detachably secured to the traction chain. The carrier, at its leading edge, is connected to a chain connecting axle which is articulatedly connected to the chain by means of supporting links having elongated openings.

2. Discussion of the Prior Art

Apron conveyors have been known. They are generally employed in the metallurgical and cement industries and are subjected to heavy wear, particularly at the articulated joints and pivots of the components of the conveyors. Such wear gives rise to impacts of the chain connecting axle at the leading end of the conveyor in elongated openings of supporting links.

Apron conveyors are known wherein the roller carrying axle, at the trailing end of each carrier, is connected to the chains by so-called coupling flights. The chain connecting axle, at the leading edge, is carried by links which are provided in elongated openings to compensate for link changes at the points of reversal of the traction chain. The pivot consists of a chain pin which connects two links of the traction chain and which has been extended for the connection to the supporting links. See German Pat. No. 972,470 and French Pat. No. 1,200,260.

In known apparatuses, the coupling flight which engages the roller carrying axle is integral with the traction chain, whereby the life of the latter depends upon the life of the coupling flight. This coupling flight is, however, subjected to heavy wear. Another disadvantage in the known constructions resides in the fact that the pivot for the supporting link is provided by the extended chain pin. Thus, when a carrier is to be replaced, the chain must be relaxed because the extended chain pin must be laterally moved in the chain bushing or in the side bars of the chain to permit replacement.

It is an object of this invention, therefore, to provide a simple and quick replacement means for the special parts of an apron conveyor, especially one subjected to heavy wear, as is experienced in the metallurgical and cement industries. It is a further object of this invention, therefore, to provide a simple and economical apron conveyor.

SUMMARY OF THE INVENTION

These and other objects of this invention are accomplished by a conveyor comprising an endless sprocket toothed traction chain disposed about and engaged by at least two sets of sprocketed teeth reversing means, said traction chain carrying a carrier, said carrier being attached at its trailing end to a roller carrying axle, said roller carrying axle being connected to said traction chain with a coupling flight, said coupling flight being detachably secured to said traction chain, said carrier being connected at its leading edge to a chain connecting axle, said chain connecting axle being connected to a supporting link, said supporting link being secured by a pin to a chain link of said traction chain, said pin being disposed above the center line of said chain link at the center of the length thereof, the tooth spacing of the chain being such that a tooth space is associated with the pin of said supporting link as said pin enters a sprocket.

In the apron conveyor of the present invention, the traction chain is provided with uniform, normal roller chain links connected by pins of uniform length. Coupling flights cooperate with roller carrying axles. The coupling flights, according to one feature of the invention, are detachably secured to the side bars of the traction roller chain. Supporting links, on the other hand, are secured to other chain links by the use of a pin disposed above the center line of the chain. The pin connects the supporting links which extend to be secured to a chain connecting axle. The pin is also disposed at the center of the length of a chain link. The traction chain is provided with tooth spacing for the chain sprockets, such that a tooth space is associated with the pin of each supporting link as the pin enters the sprocket. The required tooth pitch of the chain sprockets can be obtained by a number of means, such as by the use of chain sprockets having a tooth pitch that is half the pitch of the chain links.

In the construction of the invention, the carriers are disposed above the upper flight of the sprocketed chain. These carriers are connected to the traction chains by the special elements consisting of the so-called coupling flights and supporting links. These special elements are required because the carriers, in effect, perform a pivotal movement when the direction of the chain is being reversed. This pivotal movement requires compensation for change in length along a cord of the pitch circle of the chain sprockets as the chains revolve about the chain sprockets.

According to a preferred feature, the coupling flights are screw-connected to the side bars of the roller chains from the outside. With that design, the entire interior space in the roller chain links remains free for the engagement of the chain sprockets and the coupling flights can be replaced easily.

According to another preferred feature, the coupling flights are disposed on opposite sides of each traction chain. This results in a particularly favorable connection and in a satisfactory running of the traction chains.

According to a further preferred feature, the coupling flights are the supporting links have shell-like contacting portions, which form parts of articulated joints. This will minimize the wear of the contacting portions of the axles of the carriers and the coupling flights and supporting links.

BRIEF DESCRIPTION OF DRAWINGS

The invention will be explained more fully and by way of example with reference to the drawings.

FIG. 2 is in its right-hand half a section taken on line B—B in FIG. 1 through the leading end of the carrier provided with the supporting link.

DESCRIPTION OF SPECIFIC EMBODIMENT

Figure 1:
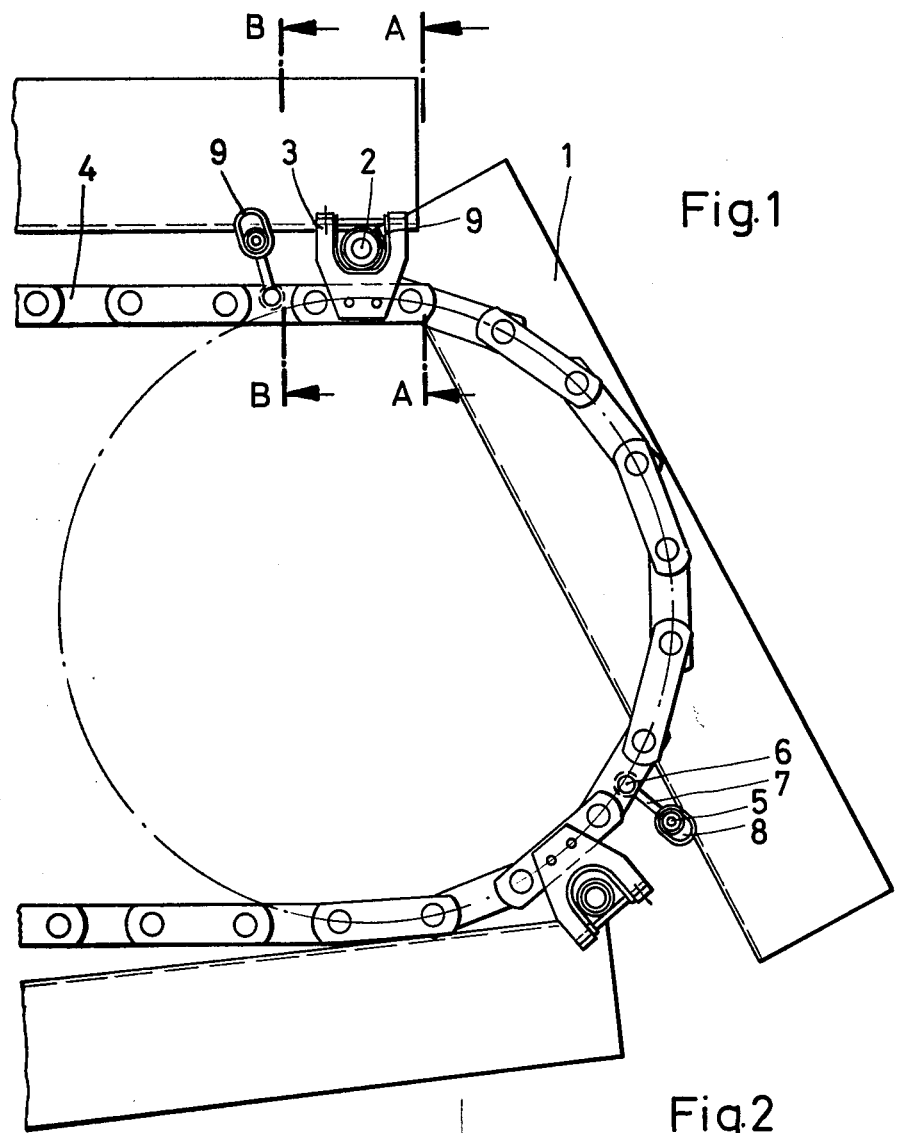
FIG. 1 is a side elevation showing an apron conveyor adjacent to a reversing station. The chain sprocket is shown only by its pitch circle for greater clarity.

The apron conveyor moves in the clockwise sense in FIG. 1. The traction chains 4 consist of uniform, normal roller chain links. The pins which connect the roller chain links are of uniform length. Each carrier 1 consisting of steel plate is articulatedly connected at its trailing end to the traction chains 4 by means of a roller-carrying axle 2 and a coupling flight 3 coupled to the traction chain 4. The coupling flights 3 are screw-connected to the outside of the outer side bars of the roller chains 4. At its leading end, each carrier 1 is articulatedly connected to the traction chains by a chain-connecting axle 5, a supporting link 7, provided with an elongated hole 8, and a mounting pin 6. Each mounting pin 6 is secured to a traction chain 4 above its center line at the center of the length of a chain link which is adjacent to the type of chain link to which the coupling flight 3 is secured. The chain sprockets have such a tooth pitch that a tooth space is associated with each mounting pin 6 and each pin 6 entering a chain sprocket will be received by a tooth space of the chain sprocket.

Figure 2:
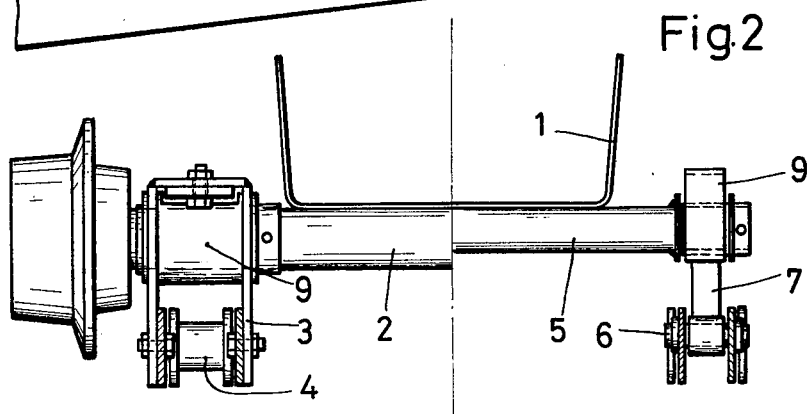
FIG. 2 is in the left-hand half a sectional view taken on line A—A of FIG. 1 through the trailing end of the carrier, where the latter is provided with rollers and cooperates with the coupling flights.

FIG. 2 shows in its left-hand half that coupling flights 3 are screw-connected to the side bars of the traction chain 4 on opposite sides. The coupling flights 3 and the supporting links 7 have shell-like contacting portions 9 in contact with the roller-carrying axle 2 and the chain-connecting axle 5, respectively.

As seen in the annexed drawings, the coupling flight 3 rise from the sprocket-toothed traction chain to hold therein via the shell-like contacting portions 9 the roller-carrying axle which in turn is connected to the carrier 1. Detachable securement of the coupling flight 3 to the traction chain 4 is provided by a screw in the embodiment illustrated in the drawings. Obviously, other means for detachable securement of the coupling flight 3 to the traction chain 4 can be provided, such as pins, dowels, or the like.

Similarly, the supporting link 7 disposed at the opposed end of the carrier 1 rises from a chain link toward the carrier disposed thereover. The supporting link 7 is connected to the carrier 1 via a chain connecting axle secured within the elongated hole or slot 8 whereby movement is permitted upon a reversal of direction of the traction chain.

The advantages of the invention reside mainly in that there is a clear distinction between the traction chains and the wearing parts consisting of the coupling flights and the supporting links. For this reason, the wearing parts can be replaced separately from each other and from the chains. The life of the chain is not affected by the wear of said wearing parts, which may be made from less expensive material, particularly if the chains are heavy, as the material must meet less stringent requirements. The mounting of the supporting links on the side bars of the chain links also reduces the costs as well as the number of loose parts. The links of the chains may consist of uniform roller chain links, which are connected by pins of uniform length.

What is claimed is:

1. A conveyor comprising an endless sprocket-toothed traction chain comprising uniform chain links connected by uniform chain pins and disposed about and engaged by at least two sets of sprocketed teeth reversing means, said traction chain carrying a carrier, said carrier being attached at its trailing end to a roller carrying axle, said roller carrying axle being connected to said traction chain through a coupling flight, said coupling flight being detachably secured to said bars of a chain link of said traction chain, said carrier being connected at its leading edge to a chain-connecting axle, said chain-connecting axle being connected to a supporting link provided with an elongated hole, said supporting link being secured by a supporting pin directly to a chain link of said traction chain, said supporting pin being disposed above the center line of the chain link at the center of the length of a chain link which is adjacent to the type of chain link to which said coupling flight, the chain sprockets having such a tooth pitch that a tooth space is associated with each supporting pin whereby each supporting pin entering a chain sprocket is received by a tooth space of the chain sprocket.

2. A conveyor according to claim 1 wherein said coupling flight is screw connected to links of the traction chain from the outside.

3. A conveyor according to claim 1 wherein coupling flights are provided on both sides of said traction chain.

4. A conveyor according to claim 1 wherein said coupling flights and supporting links have shell-like contacting portions which form portions of articulated joints.

* * * * *

UNITED STATES PATENT AND TRADEMARK OFFICE
CERTIFICATE OF CORRECTION

PATENT NO. : 4,252,235

DATED : Feb. 24, 1981

INVENTOR(S) : Rudolf Schepers et al

It is certified that error appears in the above—identified patent and that said Letters Patent is hereby corrected as shown below:

Title Page, Assignee    Delete "Vertriebd" and insert --Vertriebs--.

Column 4, Line 24    Delete "said" and insert --side--.

Signed and Sealed this

Fourteenth Day of July 1981

[SEAL]

Attest:

GERALD J. MOSSINGHOFF

Attesting Officer    Commissioner of Patents and Trademarks